(12) United States Patent
Ellis et al.

(10) Patent No.: US 6,327,108 B1
(45) Date of Patent: Dec. 4, 2001

(54) FILTER CALIBRATION METHOD IN A DISC DRIVE AND APPARATUS

(75) Inventors: Timothy F. Ellis, Tonka Bay; Alexei H. Sacks, St. Louis Park, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/017,442

(22) Filed: Feb. 2, 1998

Related U.S. Application Data

(60) Provisional application No. 60/057,140, filed on Aug. 28, 1997.

(51) Int. Cl.⁷ .............................. G11B 5/035; G11B 5/09
(52) U.S. Cl. .................................. 360/65; 360/46
(58) Field of Search ........................... 360/46, 51, 65; 375/232

(56) References Cited

U.S. PATENT DOCUMENTS

| | | | |
|---|---|---|---|
| 5,117,408 | 5/1992 | Weispfenning et al. | 369/32 |
| 5,301,080 | 4/1994 | Ottesen et al. | 360/113 |
| 5,367,409 | 11/1994 | Ottesen et al. | 360/32 |
| 5,586,144 | * 12/1996 | Kahlman et al. | 360/65 |
| 5,592,340 | * 1/1997 | Minuhin et al. | 360/65 |
| 5,638,225 | * 6/1997 | Tsuboi et al. | 360/65 |
| 5,677,802 | 10/1997 | Saiki et al. | 360/51 |
| 6,025,712 | 2/2000 | Mian | 324/210 |

FOREIGN PATENT DOCUMENTS

| | | |
|---|---|---|
| 59-33618 | 2/1984 | (JP) . |
| 359033618A | 2/1984 | (JP) . |
| 60-70552 | 4/1985 | (JP) . |
| 360070552A | 4/1985 | (JP) . |

\* cited by examiner

Primary Examiner—Regina Y. Neal
(74) Attorney, Agent, or Firm—Theodore M. Magee; Westman, Champlin & Kellly, P.A.

(57) ABSTRACT

A method and apparatus detects and filters pulse asymmetries in a read signal of a data storage device. A value indicative of the difference between the shape of a pulse from its first zero crossing to its peak and the shape of the pulse from its second zero crossing to its peak is determined. This value is minimized by adjusting at least one filter characteristic of a read signal filter.

10 Claims, 10 Drawing Sheets

FILTER CALIBRATION METHOD IN A DISC DRIVE AND APPARATUS

REFERENCE TO RELATED APPLICATION

The present application claims priority benefits from U.S. provisional application Ser. No. 60/057,140 filed on Aug. 28, 1997.

The present application is also related to a U.S. patent application having Ser. No. 09/078,179 that was filed on May 13, 1998 now U.S. Pat. No. 6,249,392 and is entitled "Head Instability Detection Method and Apparatus". The inventors of the present application and of the 09/078,179 application were under a duty to assign their inventions to the common Assignee of both applications.

FIELD OF THE INVENTION

The present invention relates to disc drive servo systems. In particular, the present invention relates to filters in servo systems.

BACKGROUND OF THE INVENTION

Magnetic storage devices store data on magnetic media using write heads that generate small magnetic fields. As a write head passes over a medium, its small magnetic field alters localized magnetic moments on the medium. Data is retrieved from magnetic media using read heads that sense transitions in the localized magnetic fields generated by each of these magnetic moments. In response to each of these transitions, a read head generates electrical pulses that are part of a series of pulses forming a read signal. The pulses are either positive or negative depending on the direction of the magnetic moment transition.

Ideally, each pulse rises and falls quickly to provide a very sharp and large peak for detection. Unfortunately, capacitive and inductive effects and magneto-resistive head effects often cause shouldering just before or just after the peak. In extreme cases, this shouldering can be detected as a peak and can cause some data to be obscured. In addition, noise in the read channel often interferes with proper peak detection.

Prior art systems have attempted to remove noise and shouldering from the pulses using fixed filters that are designed to produce the best average pulses for an entire line of magnetic storage devices. However, these fixed filters are unable to accommodate pulse idiosyncracies that are found in individual data storage devices within a line of data storage devices. In addition, in disc drives, such fixed filters are unable to accommodate changes in the pulse shape that occur because the head has moved to different radial positions along the disc.

The present invention addresses these and other problems, and offers other advantages over the prior art.

SUMMARY OF THE INVENTION

A method and apparatus detects and filters pulse asymmetries in a read signal of a data storage device. A value indicative of the difference between the shape of a pulse from its first zero crossing to its peak and the shape of the pulse from its second zero crossing to its peak is determined. This value is minimized by adjusting at least one filter characteristic of a read signal filter.

In the present invention, a phase-locked loop clock signal is aligned with an input read signal such that the peaks of the read signal occur at transitions in the phase-locked loop clock signal. These two signals are then multiplied together. The resulting product is integrated to produce a series of integrands. If the pulses are symmetrically shaped about their peaks, the integrands will be equal to zero. However, if the pulses are asymmetrical, the integrands will have magnitudes greater than zero. A processor receives the integrands and attempts to minimize the magnitude of the integrands by adjusting the filter characteristics of a read signal filter.

BRIEF DESCRIPTION OF THE DRAWINGS

FIG. 4(2) is a timing diagram of filter output 174 before filter 172 of FIG. 3 as been adjusted.

FIG. 4(3) is a timing diagram of qualifier output 182 before filter 172 has been adjusted.

FIG. 4(4) is a timing diagram of delayed signal 190 before filter 172 has been adjusted.

FIG. 4(5) is a timing diagram of clock signal 194 before filter 172 has been adjusted.

FIG. 4(6) is a timing diagram of product signal 196 before filter 172 has been adjusted.

FIG. 5(2) is a timing diagram of filter output 176 before delay calibration.

FIG. 5(3) is a timing diagram of qualifier output 182 before delay calibration.

FIG. 5(4) is a timing diagram of delayed signal 190 before delay calibration.

FIG. 5(5) is a timing diagram of clock signal 194 before delay calibration.

FIG. 5(6) is a timing diagram of product signal 196 before delay calibration.

FIG. 6(2) is a timing diagram of filter output 176 after delay calibration.

FIG. 6(3) is a timing diagram of qualifier output 182 after delay calibration.

FIG. 6(4) is a timing diagram of delayed signal 190 after delay calibration.

FIG. 6(5) is a timing diagram of clock signal 194 after delay calibration.

FIG. 6(6) is a timing diagram of product signal 196 after delay calibration.

FIG. 7(2) is a timing diagram of filter output 176 after delay calibration and before filter adjustment.

FIG. 7(3) is a timing diagram of qualifier output 182 after delay calibration and before filter adjustment.

FIG. 7(4) is a timing diagram of delayed signal 190 after delay calibration and before filter adjustment.

FIG. 7(5) is a timing diagram of clock signal 194 after delay calibration and before filter adjustment.

FIG. 7(6) is a timing diagram of product signal 196 after delay calibration and before filter adjustment.

FIG. 9(2) is a timing diagram of filter output 176 after filter adjustment.

FIG. 9(3) is a timing diagram of qualifier output 182 after filter adjustment.

FIG. 9(4) is a timing diagram of delayed signal 190 after filter adjustment.

FIG. 9(5) is a timing diagram of clock signal 194 after filter adjustment.

FIG. 9(6) is a timing diagram of product signal 196 after filter adjustment.

DETAILED DESCRIPTION OF THE PREFERRED EMBODIMENTS

Figure 1:
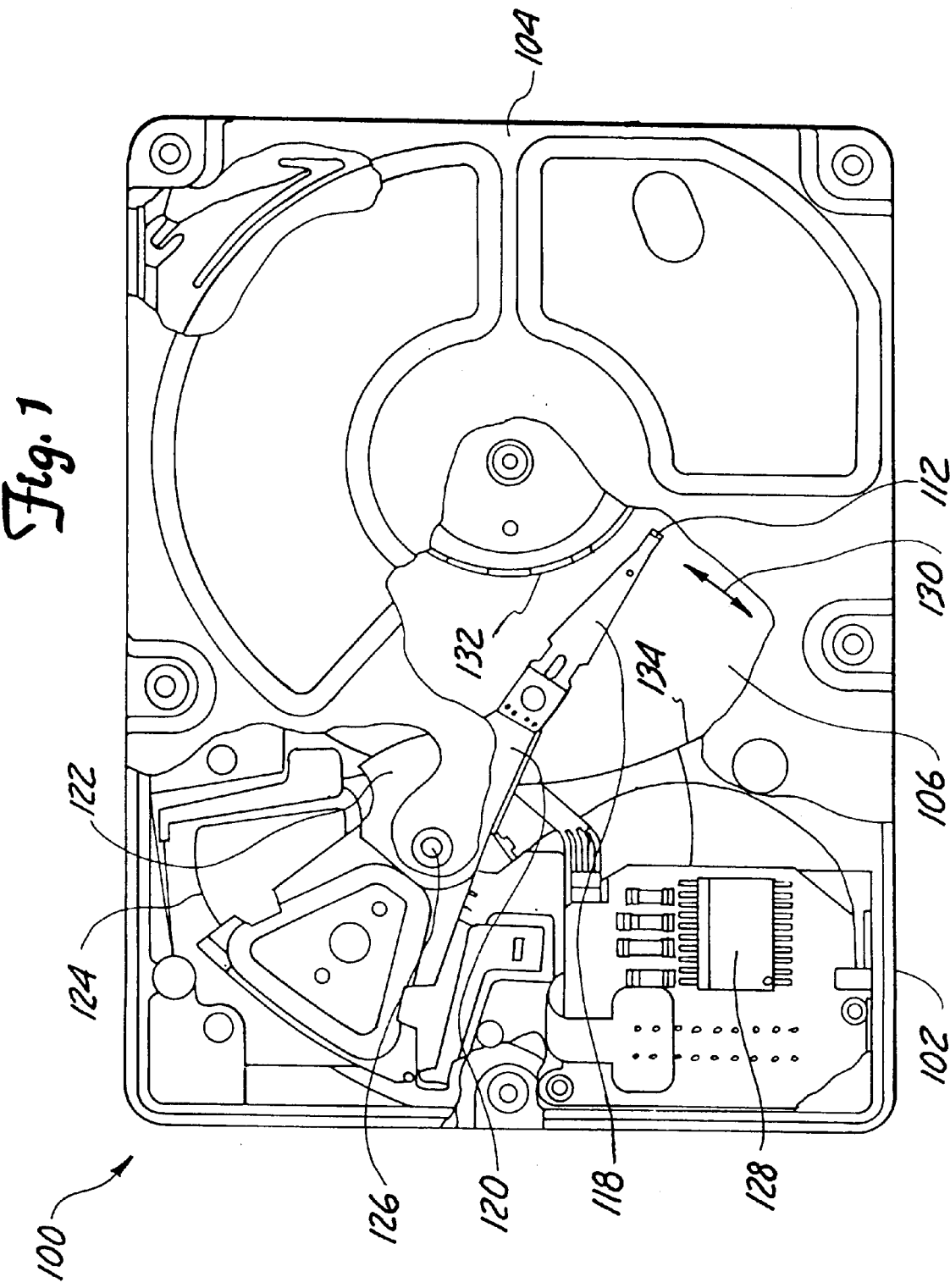
FIG. 1 is a plan view of a disc drive storage system.

FIG. 1 is a plan view of disc drive 100 according to the present invention. Disc drive 100 includes a housing with a base plate 102 and a top cover 104 (sections of top cover 104 are removed for clarity). Disc drive 100 further includes a disc pack 106, which is mounted on a spindle motor (not shown). Disc pack 106 may include a plurality of individual discs which are mounted for co-rotation about a central axis. Each disc surface has an associated head gimbal assembly (HGA) 112, which is mounted to disc drive 100 for communication with the disc surface. Each HGA 112 includes a gimbal and a slider, which carries one or more read and write head. The HGAs 112 are supported by suspensions 118 which are in turn attached to track accessing arms 120 of an actuator assembly 122. Actuator assembly 122 is preferably an E-block assembly having multiple accessing arms. Actuator assembly 122 is rotated about a shaft 126 by an actuator 124, which is controlled by servo control circuitry 128 to position the heads at a desired data track on the disc. HGA 112 travels along an arcuate path 130 between a disc inner diameter 132 and a disc outer diameter 134.

Figure 2:
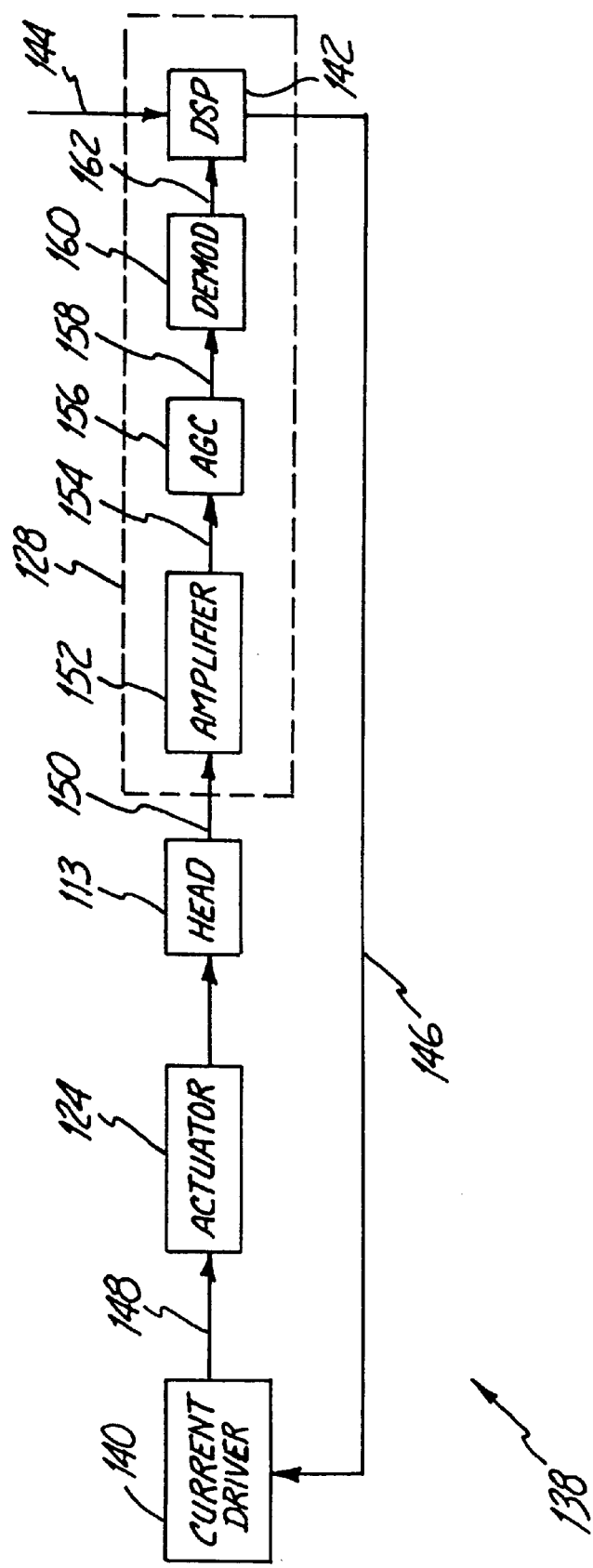
FIG. 2 is a block diagram of a servo loop of disc drive 100 of FIG. 1.

FIG. 2 is a block diagram of a servo loop 138 including servo circuitry 128, head 113, actuator 124 and current driver 140. Servo circuitry 128 includes a Digital Signal Processor (DSP) 142 that receives position requests from a remote processor (not shown) along data bus 144. The position requests include a desired location for head 113. Digital signal processor 142 stores a driver word 146 in current driver 140 that represents the distance and direction that digital signal processor 142 wants to move head 113. Current driver 140 creates a current 148 based upon driver word 146 that is passed through actuator 124 and causes actuator 124 to move head 113.

At its new position, head 113 reads servo information stored on the disc including but not limited to track identification codes, and position error signals. The position error signals typically take the form of repetitive transitions in the magnetic moments of the disc. Head 113 reads this servo information and provides servo read signal 150 to servo circuitry 128.

In particular, servo read signal 150 is provided to amplifier 152 of servo circuitry 128. Amplifier 152 amplifies servo read signal 150 and provides an amplified signal 154 to automatic gain control (AGC) 156. Automatic gain control 156 adjusts the average peak level so that the average peak level approaches a desired level.

Automatic gain control 156 provides a read signal 158 to demodulator 160. Demodulator 160 includes a phase-locked loop that generates a clock signal with the same frequency as read signal 158. Demodulator 160 recovers digital data fields, track identification values, cylinder identification values, and position error values based upon read signal 158.

Demodulator 160 conveys the position information to digital signal processor 142 along bi-directional serial port 162. Digital signal processor 142 uses this information to determine the current position of the head and creates a driver word 146 based on this determined position and the requested position found on data bus 144.

Servo loop 148 of FIG. 2 can be used either in a track seeking operation where digital signal processor 142 is attempting to move head 113 to a specific track or may be used in a track following operation where digital signal processor 142 attempts to maintain head 113 within a track on the disc.

Figure 3:
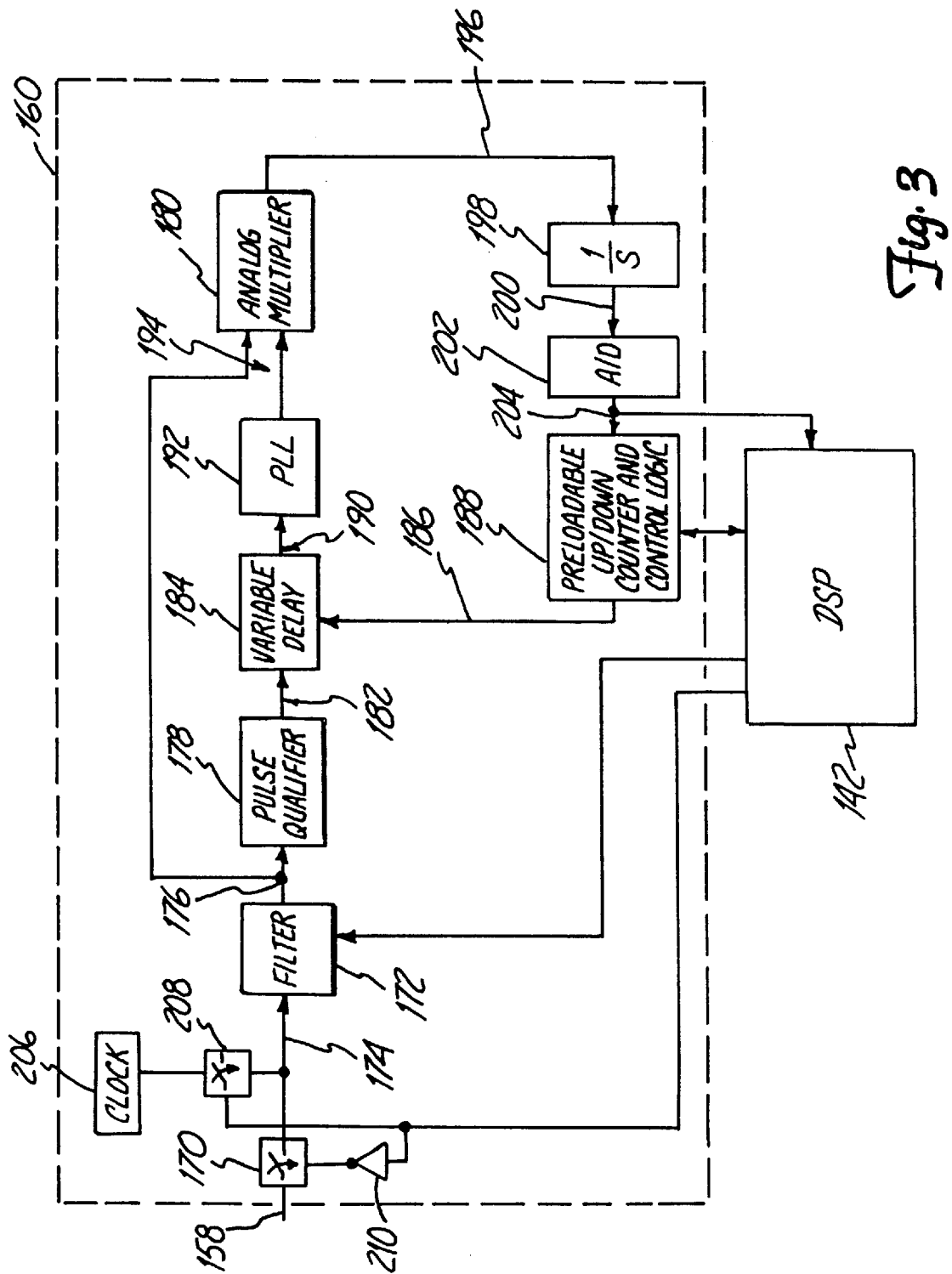
FIG. 3 is an expanded block diagram of demodulator 160 of FIG. 2.

FIG. 3 is an expanded block diagram of demodulator 160 of FIG. 2. In FIG. 3, serial port connection 162 between demodulator 160 and digital signal processor 142 is shown as several individual connections. Those skilled in the art will recognize that although a plurality of connections are shown, digital signal processor 142 is connected to demodulator 160 only through a single serial port. The multiple connections are shown simply to aid in understanding the invention.

Read signal 158 enters demodulator 160 through a switch 170. A read filter 172 is connected to switch 170 at a filter input 174. Filter input 174 is also connected to switch 208, which has a second terminal connected to a clock 206. Switches 170 and 208 are controlled by digital signal processor 142 through their respective control inputs. The two switches are always in opposite states as symbolized by invertor 210 at the control input to switch 170. Read filter 172 filters the signal on filter input 174 to produce a filter output 176 that is input to pulse qualifier 178 and to analog multiplier 180. Pulse qualifier 178 produces a one-shot pulse for each peak in filter output 176 to create qualifier output 182.

Qualifier output 182 is provided to variable delay 184 that also receives delay control 186 from control logic 188. Variable delay 184 delays qualifier output 182 based on delay control 186 to produce delayed signal 190, which is provided to phase-locked loop (PLL) 192. Phase-locked loop 192 generates a square-wave clock signal 194 that has half the frequency of the pulses in delayed signal 190. Clock signal 194 is input to analog multiplier 180 along with filter output 176.

Analog multiplier 180 multiplies filter output 176 by clock signal 194 to produce product signal 196. Product signal 196 is input to integrator 198, which integrates product signal 196 to produce integrand signal 200 that is input to analog-to-digital converter 202. Analog-to-digital converter 202 converts analog integrand signal 200 into digital integrands 204, which are provided to control logic 188. The integrand values can be used as an indication of the alignment between clock signal 194 and filter output 176, or the symmetry of the pulses on filter output 176. Based on the integrand values, control logic 188 produces delay control 186 which is provided to variable delay 184 in a manner discussed further below. Digital integrands 204 are also provided to digital signal processor 142, which uses these values to control filter 172 and control logic 188 in a manner discussed further below.

Figure 4:
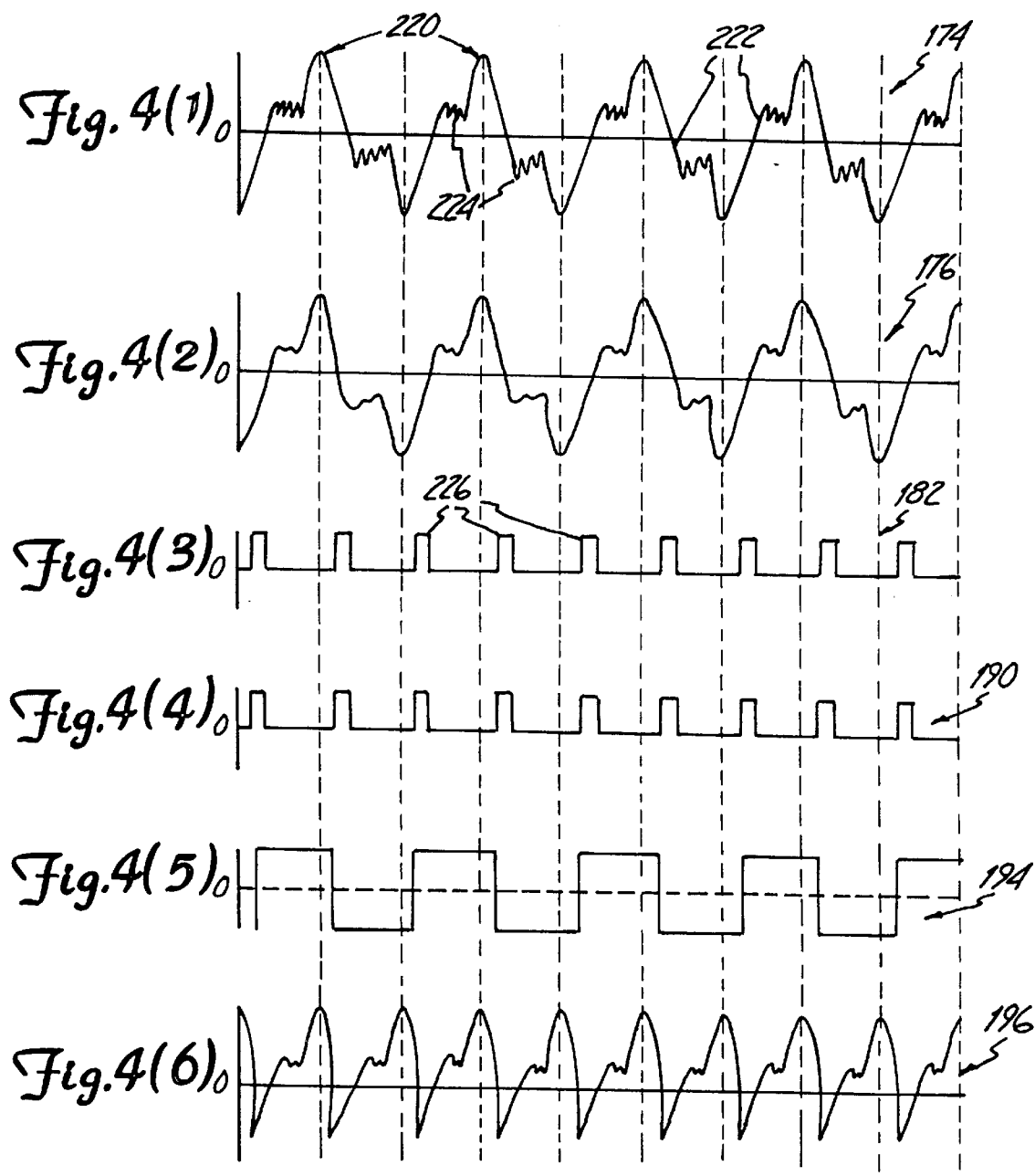
FIG. 4(1) is a timing diagram of a noisy read signal from AGC 156 of FIG. 2.
Figure 5:
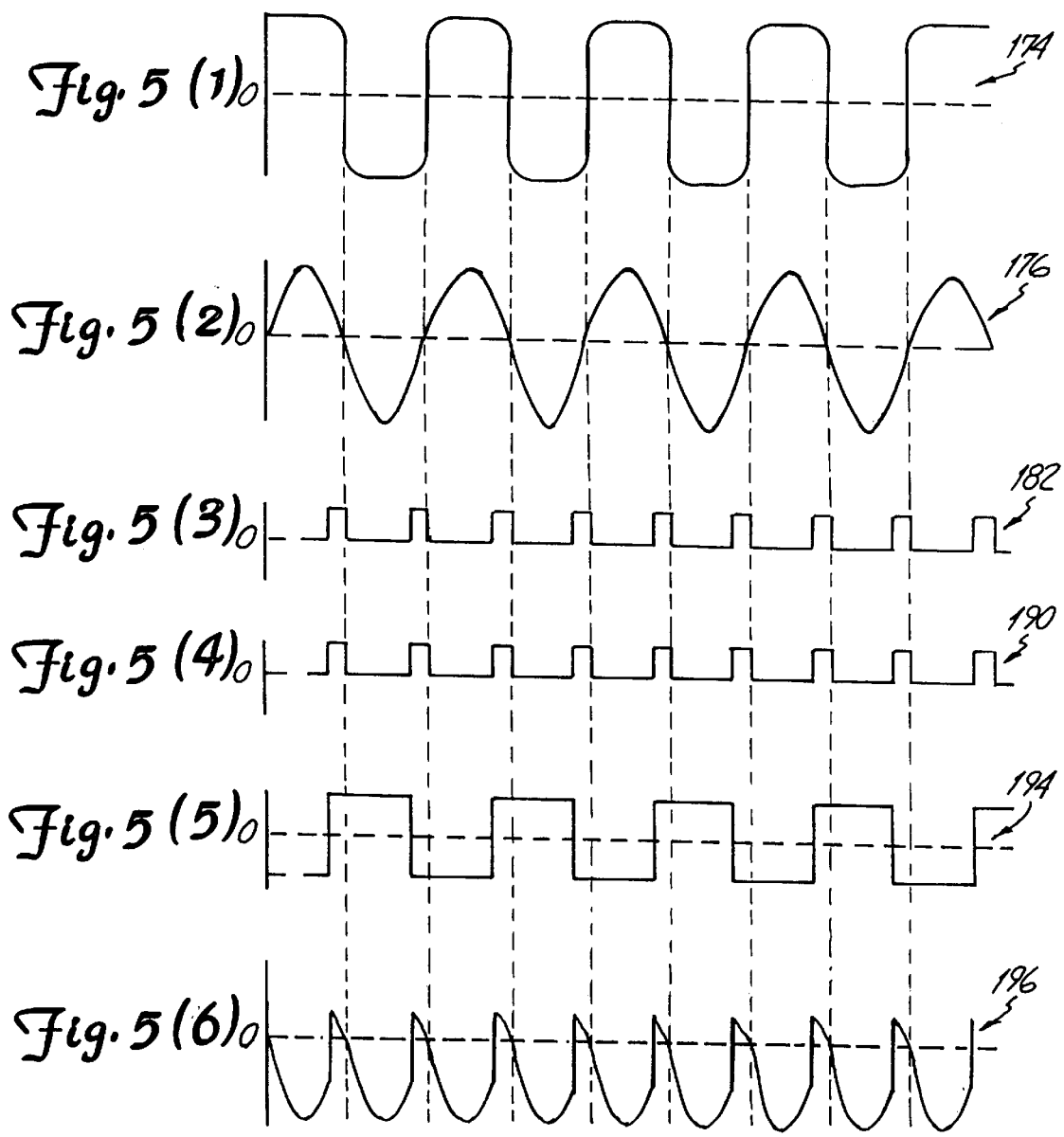
FIG. 5(1) is a timing diagram for a fixed clock signal at filter input 174 used during delay calibration.
Figure 6:
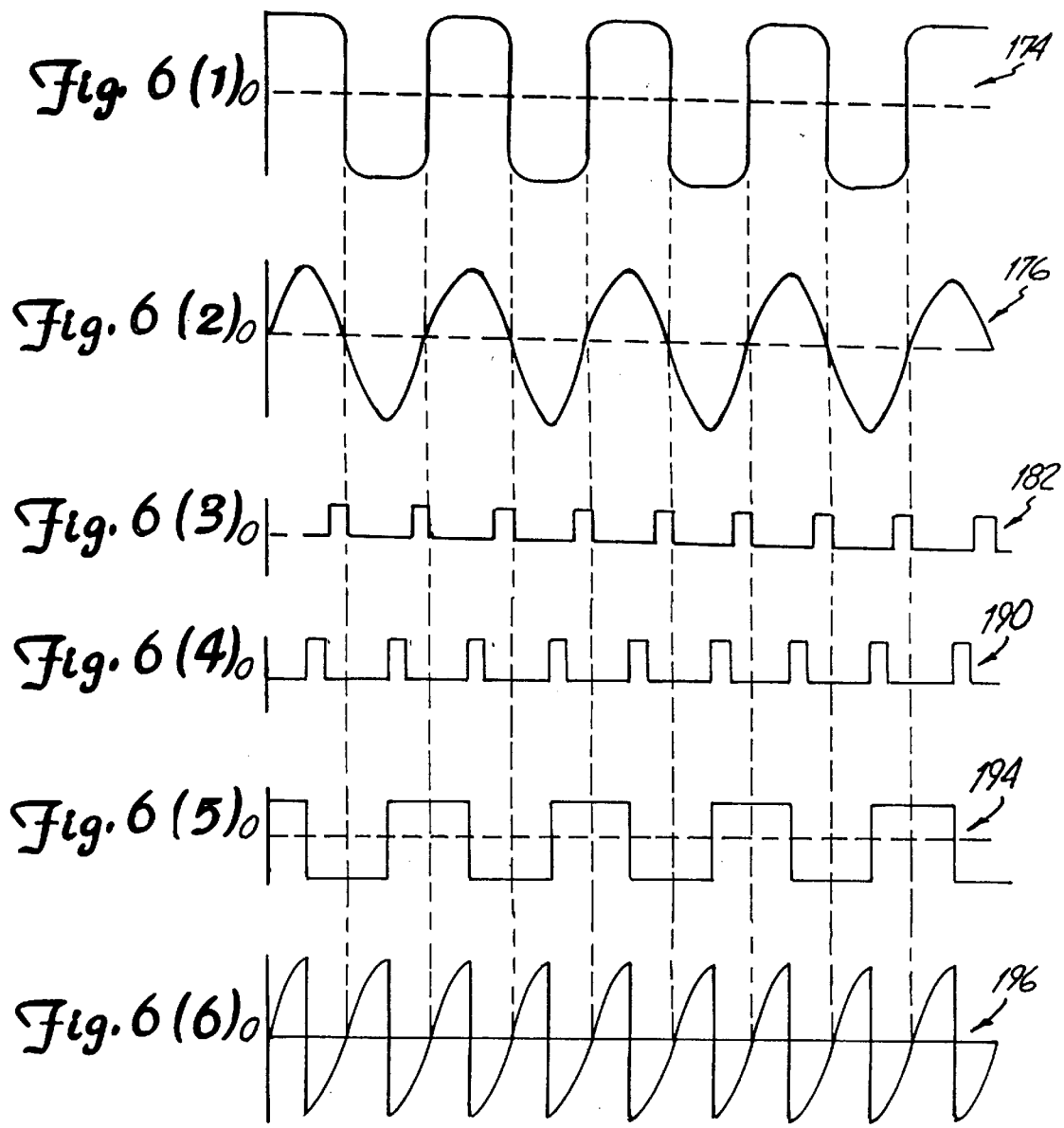
FIG. 6(1) is a timing diagram of a fixed clock signal on filter input 174 after delay calibration.
Figure 7:
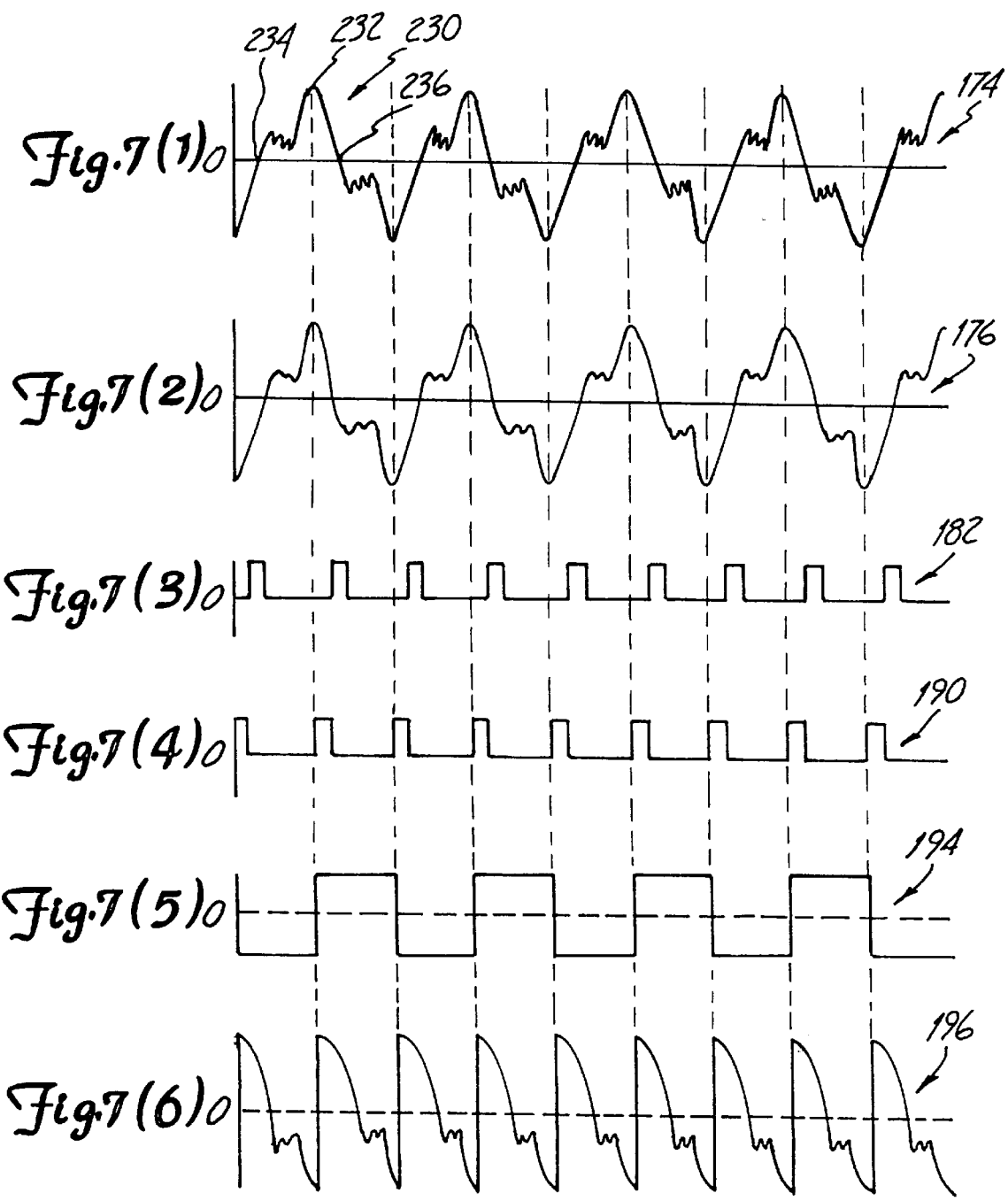
FIG. 7(1) is a timing diagram of read signal 158 at filter input 174 after delay calibration and before filter adjustment.
Figure 9:
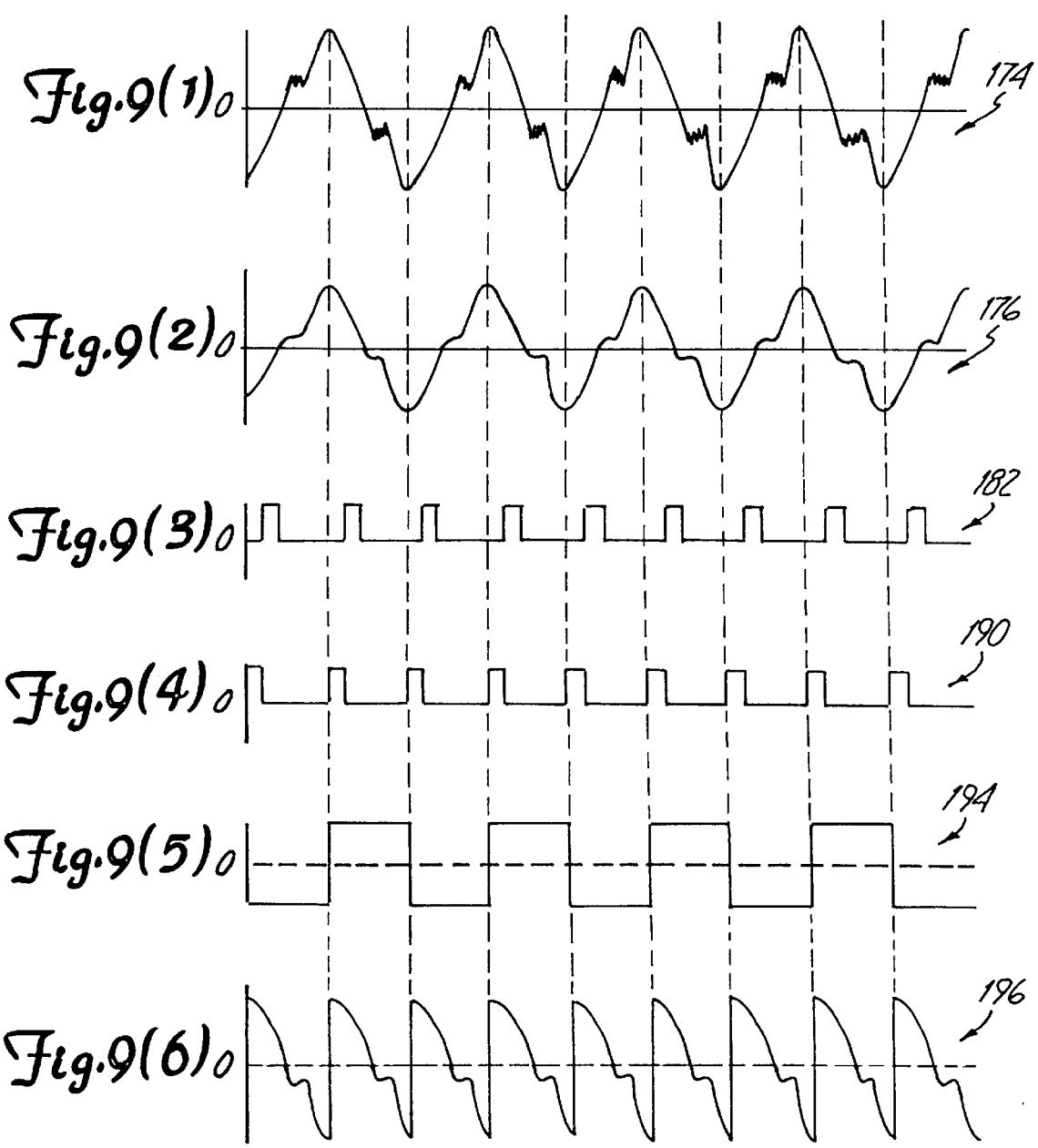
FIG. 9(1) is a timing diagram of read signal 158 at filter input 174.

The present invention provides a means for measuring and correcting pulse asymmetry. Preferred embodiments of the present invention are described through a series of timing diagrams showing the signals in demodulator 160. FIGS. 4(1) through 4(6) show these signals before demodulator 160 has been calibrated to detect pulse asymmetry. FIGS. 5(1) through 5(6) show these signals in the first stage of calibrating demodulator 160 so that it may detect pulse asymmetry. FIGS. 6(1) through 6(6) show these signals during the last stage of calibrating demodulator 160. FIGS. 7(1) through 7(6) show these signals during pulse asymmetry detection. FIGS. 9(1) through 9(6) show these signals after pulse asymmetry correction.

FIGS. 4(1) through 4(6) show signals in demodulator 160 before the demodulator has been calibrated to detect pulse asymmetry. Specifically, FIGS. 4(1), 4(2), 4 (3), 4(4), 4(5) and 4(6) show signals on filter input 174, filter output 176, qualifier output 182, delayed signal 190, clock signal 194, and product signal 196, respectively. FIGS. 4(1) through 4(6) have a common horizontal time axis such that the portions of the signals that are aligned vertically occur at the same point in time. The vertical axis for each of the signals is measured in volts.

FIG. 4(1) is a graph of an example read signal 158, which appears on filter input 174 when switch 170 is closed and switch 208 is open. The signal of FIG. 4(1) has peaks 220, shoulders 222 and high frequency noise 224. Ideally, shoulders 222 and noise 224 should not exist. Note that read signal 158 is just one example of possible read signals. Those skilled in the art will recognize that different heads will cause different pulse asymmetry. For instance, some heads will have shouldering after the peaks instead of before the peaks as shown in FIG. 4(1).

Before filter adjustment, filter 172 is set at its maximum cut-off frequency. As such, filter 172 provides a minimum amount of filtering, which results in a reduction of some noise at the shoulders of filter input 174, but very little reduction in the shoulders themselves. The result of this minimal filtering is filter output 176 shown in FIG. 4(2).

FIG. 4(3) depicts qualifier output 182, which includes a series of pulses 226. Qualifier output 182 includes one pulse 226 for each peak detected by pulse qualifier 178. Because of the construction of pulse qualifier 178, pulses 226 are delayed from their respective peaks in filter output 176.

FIG. 4(4) depicts delayed signal 190, produced by variable delay 184. Before calibration, variable delay 184 does not delay qualifier output 182. As such, delayed signal 190 of FIG. 4(4) is identical to qualifier output 182.

FIG. 4(5) shows clock signal 194, which is generated by phase-locked loop 192 based on delayed signal 190. In particular, clock signal 194 has a frequency that is one-half the average frequency of pulses on delayed signal 190. Thus, each pulse in delayed signal 190 is associated with either a positive or negative transition in clock signal 194. Clock signal 194 is DC biased such that it is centered about ground.

FIG. 4(6) shows product signal 196 which is created by multiplying clock signal 194 of FIG. 4(5) by filter output 176 of FIG. 4(2). Because clock signal 194 is at the same frequency as the signal on filter output 176, their product, product signal 196, oscillates at twice their common frequency. In addition, because of shoulders 224, product signal 196 is positive most of the time.

To remove shoulders 222 and high frequency oise 224, the present invention first calibrates demodulator 160 so that it can detect pulse asymmetry. This calibration involves adjusting variable delay 184 so that transitions in clock signal 194 are aligned with the peaks of filter output 176. As shown below, this alignment will permit a determination of the symmetry of the pulses in filter output 176.

To calibrate variable delay 184, switch 170 is opened and switch 208 is closed so that filter input 174 carries a clock signal generated by clock 206. The clock signal is a filtered square wave, which provides a better data sample for aligning clock signal 194 with filter output 176. Preferably, the clock signal produced by clock 206 matches the expected servo frequency.

FIGS. 5(1) through 5(6) show the signals of demodulator 160 with the clock signal from clock 206 provided at filter input 174 before delay 184 has been calibrated. Each of the timing diagrams shares a common horizontal time axis. FIG. 5(1) depicts the clock signal on filter input 174, which is centered about 0.

FIG. 5(2) shows filter output 176, which is a filtered version of the clock signal from clock 206. In FIGS. 5(1) through 5(6), filter 172 has not been adjusted yet and as such performs a low-pass filter function with an initial cut-off frequency. In simulations, this initial cut-off frequency has been maximized at about 3.2 times the fundamental frequency of the position error signal. However, the initial cut-off frequency can be adjusted to accommodate changes in the method described below for tuning filter 172. In any case, filter 172 filters the clock signal from clock 206, producing a sinusoidal signal at filter output 176.

FIG. 5(3) shows qualifier output 182, which provides a single pulse for each peak in filter output 176. The pulses are not aligned with the peaks in filter output 176 because of delays found in pulse qualifier 178.

FIG. 5(4) shows delayed signal 190, which is identical to qualifier output 182 of FIG. 5(3) before variable delay 184 has been calibrated. Delayed signal 190 causes phase-locked loop 192 to generate clock signal 194 of FIG. 5(5). For each positive going transition in delayed signal 190, clock signal 194 has a transition. Preferably, clock signal 194 is centered about zero.

FIG. 5(6) shows product signal 196, which is produced by multiplying clock signal 194 of FIG. 5(5) with filter output 176 of FIG. 5(2). Because of the delay produced by pulse qualifier 178, product signal 196 is asymmetrical with smaller portions above zero and larger portions below zero.

Integrator 198 of FIG. 2 integrates product signal 196 of FIG. 5(6) to produce integrand signal 200 which is sampled by A-to-D converter 202. Because of the asymmetrical shape of product signal 196, integrand signal 200 will be a large negative value. Thus, digital integrands 204 produced by A-to-D converter 202 will contain a series of large negative values.

The negative values of digital integrands 204 cause control logic 188 to adjust the delay of variable delay 184 through delay control 186. This adjustment continues until the values of digital integrands 204 are equal to zero.

FIGS. 6(1) through 6(6) depict the signals of demodulator 160 when variable delay 184 has been adjusted so that digital integrands 204 are equal to zero. Specifically, FIGS. 6(1), 6(2) and 6(3) depict signals at filter input 174, filter output 176, and qualifier output 182, which are identical to the signals shown in FIGS. 5(1), 5(2) and 5(3), respectively.

FIG. 6(4) shows delayed signal 190 after variable delay 184 has been adjusted such that upward transitions in delayed signal 190 occur at the center of the positive and negative peaks of filter output 176. Based on delayed signal 190, phase-locked loop 192 produces clock signal 194, shown in FIG. 6(5), which has transitions aligned with the peaks in filter output 176 of FIG. 6(2).

Product signal 196 of FIG. 6(6) is the product of clock signal 194 and filter output 176. Since transitions in clock signal 194 occur at the peaks of the pulses of filter output 176, the positive and negative portions of product signal 196 are symmetrical relative to each other, and thus product signal 196 integrates to a value approaching zero.

When transitions in clock signal 194 are properly aligned with the center of the peaks in filter output 176, the amount of delay created by variable delay 184 is ideal for detecting asymmetry in the pulses of read signal 158. To maintain this delay during asymmetry detection, digital signal processor 142 disables the adjustment functions of control logic 188 so that the delay remains fixed. Digital signal processor 142 also opens switch 208 to remove the clock signal of clock 206 from filter input 174, then closes switch 170 permitting read signal 158 to pass through filter 174.

FIGS. 7(1) through 7(6) show graphs of various signals of demodulator 160 with the delay of variable delay 184 fixed at the delay shown in FIG. 6(4) and read signal 158 at filter input 174. In this state, demodulator 160 can detect pulse asymmetry as discussed below.

FIG. 7(1) depicts the read signal at filter 174 which has the shouldering and high frequency noise typically found in a read signal. Each pulse in the read signal is similar to pulse 230, with a peak 232 located between two zero crossings 234 and 236.

At this point, filter 172 has not been adjusted and remains in its initial low-pass configuration with an initial cut-off frequency. In this configuration, filter 172 removes some noise from the shoulders of filter input 174, resulting in filter output 176 of FIG. 7(2).

FIG. 7(3) shows qualifier output 182, which has a positive going transition for each peak in filter output 176 of FIG. 7(2). Delayed signal 190 of FIG. 7(4) is a delayed version of qualifier output 182 and the positive going transitions in delayed signal 190 are aligned with the peaks of filter output 176. FIG. 7(5) shows clock signal 194 generated by phase-locked loop 192 in response to delayed signal 190 of FIG. 7(4). The transitions of clock signal 194 are aligned with the peaks of filter output 176 and clock signal 194 is centered about zero.

FIG. 7(6) shows product signal 196, which is the result of multiplying clock signal 194 by filter output 176. Because the transitions of clock signal 194 are aligned with the peaks of filter output 176, product signal 196 has a cyclical nature with an abrupt transition from its most negative value to its most positive value. Because of this alignment, between transitions, product signal 196 includes the second half of one peak and the first half of the next successive peak in filter output 176. In addition, across product signal 196, the peak halves have opposite polarity, such that the same peak half, either the first half or second half, is positive between each transition, and the other half is negative between each transition.

Because the peak halves have opposite polarities, asymmetries between the peak halves cause digital integrands 204 to have non-zero values. With specific reference to product signal 196 of FIG. 7(6), if the area under the first half of the peaks is generally larger than the area under the second half of the peaks, digital integrands 204 will be negative. If the area under the second half of the peaks is generally larger than the area under the first half of the peaks, digital integrands 204 will be positive.

Since each pulse generally has the same shape, asymmetries between the second half of one pulse and the first half of another pulse are the same as asymmetries between the two halves of a single pulse. Thus, by evaluating digital integrands 204, it is possible to determine asymmetries in the shapes of the pulses of the read signal. The amount of asymmetry can be used as a measure of head instability since asymmetry generally increases with head instability. Additionally, the pulse asymmetry may be monitored while making filter adjustments to achieve the best possible pulse symmetry.

During such filter adjustments, digital signal processor 142 adjusts the filter parameters of filter 172 to minimize digital integrands 204. The adjusted filter parameters include the cut-off frequency, $F_c$, the boost, $\alpha$, and the group delay, $\beta$. The cut-off frequency is the frequency at which the gain of the filter drops three decibels from its DC value. The boost and group delay are coefficients describing the transfer function of filter 172. In particular, boost, $\alpha$, and group delay, $\beta$, are found in the generalized transfer function:

$$\frac{-\alpha \cdot s^2 - \beta s + c}{(f(s))} \qquad \text{Eq. 1}$$

where s is frequency(jw), and f(s) is a function of frequency that depends on the particular filter used. Boost, $\alpha$, creates a peak in the magnitude of the filter gain just prior to the cut-off frequency of the filter. Group delay, $\beta$, causes a phase shift for certain groups of frequencies.

In preferred embodiments, digital signal processor 142 changes the filter parameters of filter 172 by writing to three separate registers each dedicated to one of the filter parameters: frequency cut-off, group delay, or boost. In preferred embodiments each of the registers is a four bit register, which is able to accommodate 16 different values. Each of the 16 values of each register is associated with a separate value for its respective filter parameter.

Digital signal processor 142 adjusts the filter parameters in response to digital instructions that can be part of a manufacturing code that is used by digital signal processor 142 only during burn-in of the disc drive and is dumped before being shipped to the customer. Alternatively, the code may remain in the disc drive and may be used during recovery processes if the head fails or if the head appears to fail and requires field diagnosis.

There are several ways to minimize digital integrands 204. The most straight forward way is to try every possible combination of cut-off frequency, boost, and group delay possible in filter 172 and determine which combination provides the lowest integrand values. Alternatively, an initial combination of filter parameters may be chosen and from that initial combination, one filter parameter at a time may be changed to determine the integrand values surrounding the first selected point. The parameters that produce the lowest neighboring integrand value are then selected and the process is repeated until a minimum integrand value is found.

A third option, sometimes called a steepest descent approach or gradient approach, begins by selecting a starting set of filter parameters, and again creating a set of neighboring integrand values by individually changing each of the parameters. The filter parameters that produce the greatest decrease in the integrand values are used to create a direction of change in the parameter values. The parameter values are then changed in accordance with that direction. The magnitude of the change in parameters is driven by the amount of change in the integrand values between the initial chosen point and the subsequent chosen point.

Figure 8:
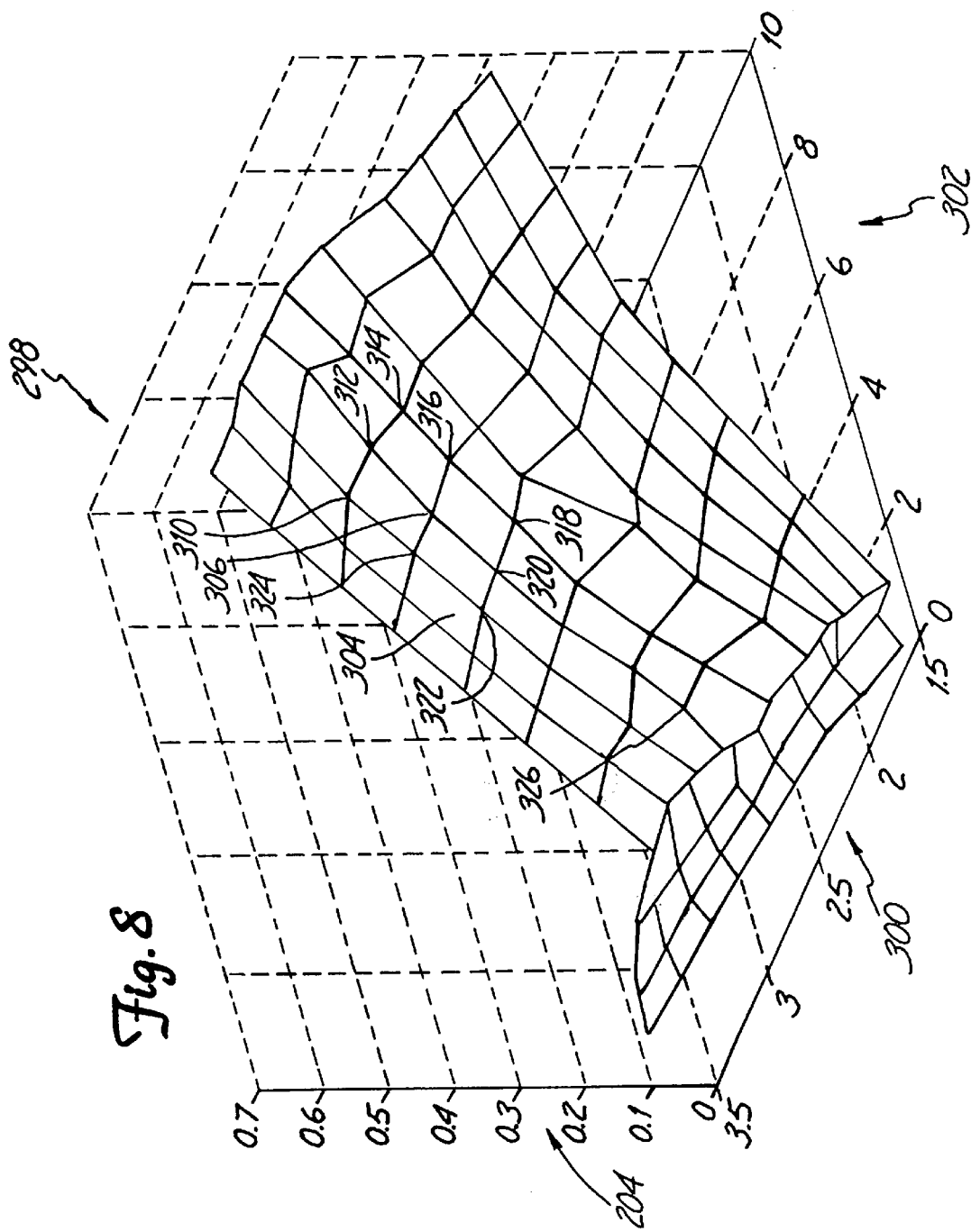
FIG. 8 is a three dimensional graph showing a two variable surface defined by two filter parameters.

This third technique is shown in FIG. 8, which shows a graph 298 of digital integrands 204 as a function of cut-off frequency, $F_c$, shown along axis 300 and group delay, $\beta$, shown along axis 302. For three-dimensional graph 298, boost is a constant. Although boost is a constant in graph 298, those skilled in the art will recognize that graph 298 is merely illustrative of a method that treats all three filter parameters as variables and is shown because the effects of all three variables on the integrand values cannot be shown without a four dimensional illustration.

In three-dimensional graph 298, digital integrands 204 reside along a surface 304 where an initial point 306 is chosen. The set of integrand values near point 306 includes points 310, 312, 314, 316, 318, 320, 322 and 324. Since point 320 provides the greatest decrease in digital integrands 204 from point 306, the direction of change in the filter parameters would be in the direction from point 306 to point 320. In addition, based on the steepness of the change from point 306 to point 320, a point such as point 326 is chosen as the next tested filter parameter combination. At point 326, this process is repeated until a minimum is achieved.

Once a minimum is found, the filter parameters that achieved that minimum are recorded. One aspect of the present invention allows different filter parameters to be used when the head is at different radial locations on the disc. This allows the present invention to accommodate changes in pulse asymmetry that arise as the head moves to different radial locations on the disc. In this form of the invention, a set of filter parameters is determined and recorded for each desired radial position range on the disc.

Another aspect of the present invention is that different filter parameters may be recorded and used for different heads in the disc drive if more than one head is present. This allows the present invention to accommodate difference in pulse asymmetry that arise due to manufacturing tolerances in producing certain types of heads as well as differences in pulse asymmetry that arise due to difference in the physical structure of different types of heads.

When a minimum digital integrand value has been located, demodulator 160 contains the signals shown in FIGS. 9(1) through 9(6). Specifically, read signal 158, which is carried on filter input 174 and is shown in FIG. 9(1), is filtered by filter 172 to produce filter output 176, which is shown in FIG. 9(2). As shown in FIG. 9(2), much of the high shouldering and high frequency noise of read signal 158 has been reduced or eliminated by filter 172. The reduction in shouldering and high frequency noise is due to the adjustments made to the filter parameters of filter 172.

Qualifier output 182 shown in FIG. 9(3) has a pulse for each peak in filter output 176, where each pulse is delayed because of pulse qualifier 178. Delayed signal 190 of FIG. 9(4) is a delayed version of qualifier output 182 and has its positive going transitions aligned with the peaks of filter output 176. From delayed signal 190, phase-locked loop 192 produces clock signal 194 of FIG. 9(5), which has transitions aligned with the peaks of filter output 176. Product signal 196, which is produced by multiplying clock signal 194 of FIG. 9(5) by filter output 176 of FIG. 9(2), is shown in FIG. 9(6). Product signal 196 has transitions from its most negative points to its most positive points, and between each pair of transitions, one period of product signal 196 includes the second half of one pulse and the first half of the next successive pulse in filter output 176. Although the two halves of the pulse are not perfectly symmetric, and their resulting integrand values are non-zero, they are more symmetric and less noisy than the pulses at filter input 174.

Figure 10:
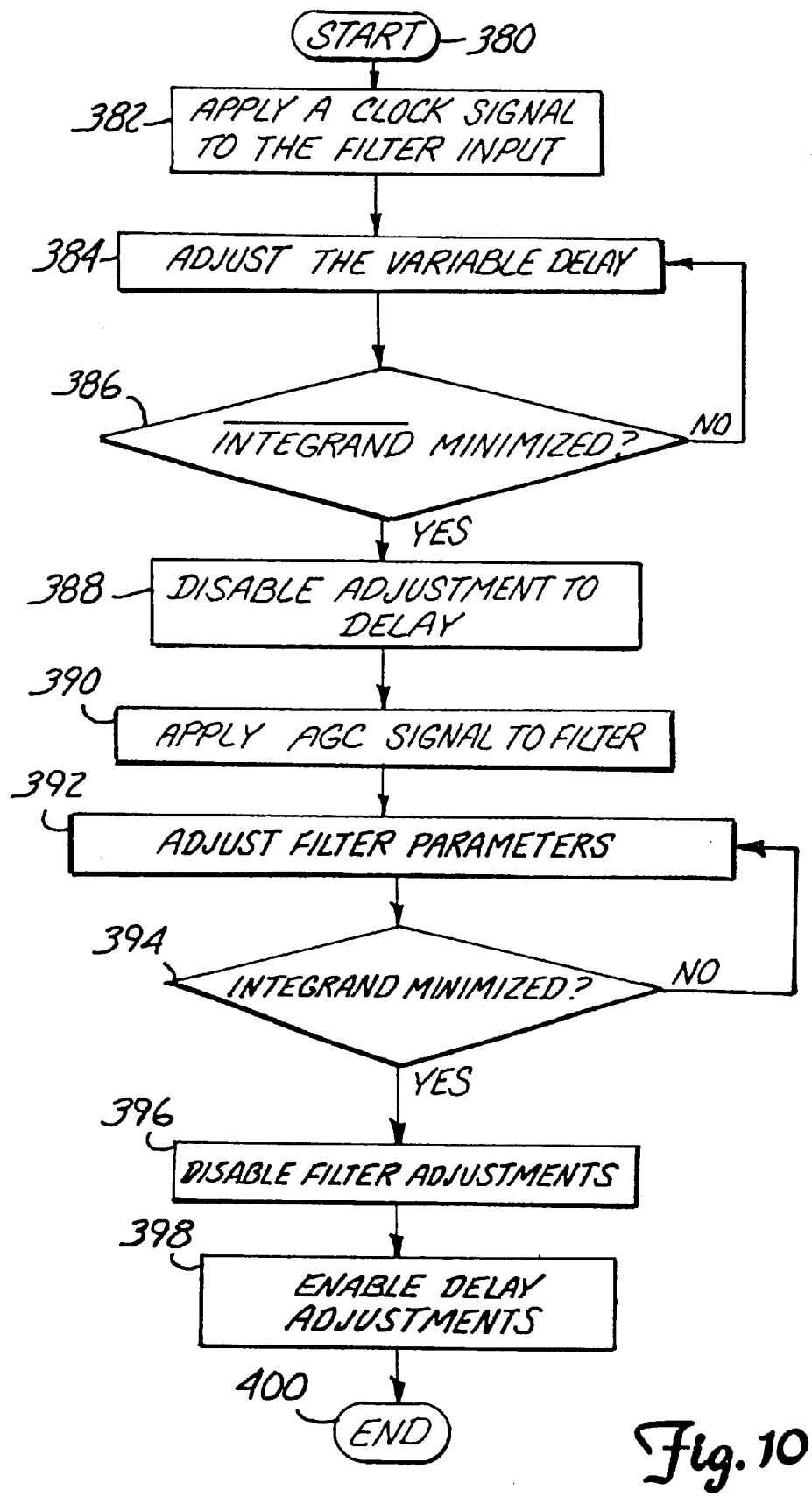
FIG. 10 is a flow diagram of a method under the present invention for adjusting a filter parameter.

FIG. 10 shows a summary of steps 348 through 368 of a method for adjusting the filter parameters of filter 172. In step 350, a clock signal is applied to filter input 174 of filter 172. In step 352, the delay of variable delay 184 is adjusted. If the integrand values produced by A-to-D converter 202 are not zero in decision box 354, the variable delay is adjusted again. If the integrand values are equal to zero, the adjustments to variable delay 184 are disabled at step 356 so as to set the amount of delay at the point where the integrand values equal zero. In step 358, the read signal is applied to filter 172 and digital signal processor 142 adjusts the filter parameters in step 360. If the integrand values have not been minimized in decision box 362, the filter parameters are further adjusted in step 360. If the integrand values have been minimized in decision box 362, the filter adjustments are disabled in step 364 and the delay adjustments are re-enabled in step 366.

In summary, the present invention provides a method for filtering a read signal 158 having pulses 230 that each have peaks 232 located between two zero crossings 234, 236. In the method, the read signal 158 is passed through an adjustable filter 172 to produce a filtered signal 176. A shape value 204 is determined that is indicative of the difference between the shapes of the pulses from their respective first zero crossings 234 to their respective peaks 232 and the shapes of the pulses from their respective second zero crossings 236 to their respective peaks 232. At least one filter characteristic 300, 302 is adjusted in the adjustable filter 172 to minimize the shape value 204.

Aspects of the invention also include a method for determining the performance of a head that produces a read signal 158. In the method, the read signal 158 is multiplied by a time varying signal 194 to produce a product signal 196. Product signal 196 is integrated to produce test integrands 204, which are compared against a baseline value to determine head performance.

The invention also includes a device 160 for determining pulse asymmetry of pulses in a read signal 158. Device 160 comprises a signal generator 178, 184, 192 receptive of read signal 158, which produces a rectification signal 194. Device 160 also comprises an analog multiplier 180 that multiplies rectification signal 194 by read signal 158 to produce a product signal 196. An integrator 198, 202 integrates product signal 196 to produce integrands 204 that are representative of pulse asymmetry.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the filtering system while maintaining substantially the same functionality without departing from the scope and spirit of the present invention. In addition, although the preferred embodiment described herein is directed to a servo loop for a data storage system, it will be appreciated by those skilled in the art that the teachings of the present invention can be applied to other systems, like satellite or telecommunication systems, without departing from the scope and spirit of the present invention.

What is claimed is:

1. A method for filtering a read signal having pulses, each pulse having a first zero crossing, a second zero crossing and a peak, the method comprising steps of:

(a) passing the read signal through an adjustable filter to produce a filtered analog signal comprising pulses having peaks;

(b) multiplying the filtered analog signal by a time-varying periodic analog signal to produce an analog product signal and integrating the analog product signal to determine a shape value indicative of shape asymmetry about respective peaks within individual pulses of the filtered signal; and (c) adjusting at least one filter characteristic of the adjustable filter based on the shape value.

2. The method of claim 1 wherein the time varying analog signal and the filtered analog signal have a substantially similar frequency.

3. The method of claim 2 wherein the time varying signal is phase shifted with respect to the filtered signal so that each transition in the time varying signal occurs when the filtered signal is proximate a peak.

4. The method of claim 3 wherein the phase shift is set by replacing the read signal with a clock signal, multiplying the clock signal by the time varying signal to produce a phase product, integrating the phase product to produce a series of phase integrands, and adjusting the phase shift until the magnitude of the phase integrands are minimized.

5. The method of claim 1 wherein the time varying analog signal is generated by a phase-locked loop based upon peaks in the read signal.

6. The method of claim 1 wherein one of the adjusted filter characteristics is a cut-off frequency of the filter.

7. The method of claim 1 further comprising steps of:

(d) positioning a read head at a plurality of positions relative to a medium;

(e) adjusting at least one filter characteristic of the adjustable filter to minimize the shape value at each position; and (f) recording the filter characteristics obtained for each position.

8. The method of claim 7 further comprising steps of:

(g) positioning the read head at a position;

(h) retrieving filter characteristics recorded for that position; and (i) applying the retrieved filter characteristics to the filter.

9. A disc drive comprising:

a magnetic recording read head, positioned over a disc to generate a signal that forms the basis of a read signal;

a filter device coupled to the read head which filters the read signal such that pulse symmetry of pulses in the read signal is improved and which produces a filtered analog read signal;

a signal generator that generates a periodic analog signal;

a multiplier that multiplies the periodic analog signal by the filtered analog read signal to produce an analog product signal;

an integrator that integrates the analog product signal to produce integrands; and a processor that adjusts the filter device based on the integrands.

10. A disc drive comprising:

a read head, positioned over a disc; and filtering means coupled to the read head for multiplying an analog signal by a periodic signal to set a filter and for filtering a read signal derived from a signal produced by the read head such that pulse symmetry of pulses in the read signal is improved.

* * * * *